United States Patent
Ogawa (10) Patent No.: US 12,292,161 B2
(45) Date of Patent: May 6, 2025

(54) MACHINE TOOL AND MACHINE TOOL SYSTEM

(71) Applicant: FANUC CORPORATION, Yamanashi (JP)

(72) Inventor: Yoshitsugu Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 428 days.

(21) Appl. No.: 17/797,860

(22) PCT Filed: Mar. 1, 2021

(86) PCT No.: PCT/JP2021/007648
§ 371 (c)(1),
(2) Date: Aug. 5, 2022

(87) PCT Pub. No.: WO2021/177216
PCT Pub. Date: Sep. 10, 2021

(65) Prior Publication Data
US 2023/0067673 A1 Mar. 2, 2023

(30) Foreign Application Priority Data
Mar. 5, 2020 (JP) .................................. 2020-037863

(51) Int. Cl.
*F16P 3/08* (2006.01)
*B23Q 11/08* (2006.01)
(Continued)

(52) U.S. Cl.
CPC ............ *F16P 3/08* (2013.01); *B23Q 11/0891* (2013.01); *B23Q 17/007* (2013.01); *H01H 3/163* (2013.01)

(58) Field of Classification Search
CPC ........................................................ F16P 3/08
See application file for complete search history.

(56) References Cited

U.S. PATENT DOCUMENTS

| | | | |
|---|---|---|---|
| 2002/0035515 A1* | 3/2002 | Moreno | B65G 1/0485 340/5.73 |
| 2010/0182148 A1* | 7/2010 | Fan | G06Q 10/0833 340/572.1 |

(Continued)

FOREIGN PATENT DOCUMENTS

| CN | 201087891 Y | 7/2008 |
|---|---|---|
| CN | 201988991 U | 9/2011 |

(Continued)

OTHER PUBLICATIONS

Nagata, Kazuhiko; International Search Report; PCT/JP2021/007648; dated May 6, 2021; 3 pages.

*Primary Examiner* — Joseph H Feild
*Assistant Examiner* — Pameshanand Mahase
(74) *Attorney, Agent, or Firm* — Renner, Otto, Boisselle & Sklar, LLP (57) ABSTRACT

A machine tool includes: a door that opens and closes an opening in a shield cover surrounding a machining chamber; an electromagnetic lock device that includes dual-system switches that detect an open/closed state of the door, and that can lock the door in a closed state; a door position detection unit that detects a position of the door; and a report unit that monitors states of the dual-system switches of the electromagnetic lock device and suggests maintenance of the door when the states differ from each other for a predetermined period of time and when the door position detection unit detects that the door is not in a closed position.

7 Claims, 7 Drawing Sheets

(51) Int. Cl.
*B23Q 17/00* (2006.01)
*H01H 3/16* (2006.01)

(56) References Cited

U.S. PATENT DOCUMENTS

| | | | | |
|---|---|---|---|---|
| 2016/0145904 | A1* | 5/2016 | Lowder | E05B 47/0001 |
| | | | | 292/145 |
| 2017/0247926 | A1* | 8/2017 | Elie | E05F 15/40 |
| 2019/0130196 | A1* | 5/2019 | Chen | G06V 20/52 |
| 2020/0224462 | A1* | 7/2020 | Renner | E05B 47/026 |
| 2020/0265664 | A1 | 8/2020 | Pizzato et al. | |

FOREIGN PATENT DOCUMENTS

| | | | | |
|---|---|---|---|---|
| EP | 0738559 | A2 | 10/1996 | |
| GB | 2300032 | A | 10/1996 | |
| JP | H09141716 | A | 6/1997 | |
| JP | H11263226 | A | 9/1999 | |
| JP | 2001137731 | A | 5/2001 | |
| JP | 2004079204 | A | 3/2004 | |
| JP | 2004156312 | A | 6/2004 | |
| JP | 2005-038664 | A1 * | 2/2005 | H01H 9/28 |
| JP | 2005028634 | A | 2/2005 | |
| JP | 2005038664 | A | 2/2005 | |
| JP | 2008038936 | A | 2/2008 | |
| JP | 2012135949 | A | 7/2012 | |
| JP | 2016150542 | A | 8/2016 | |
| WO | WO-2019092555 | A1 | 5/2019 | |

* cited by examiner

MACHINE TOOL AND MACHINE TOOL SYSTEM

TECHNICAL FIELD

The present disclosure relates to a machine tool and a machine tool system.

BACKGROUND ART

A door installed on a shield cover of a machine tool is equipped with an electromagnetic lock device that locks the door in a closed state (for example, see PTL 1). This electromagnetic lock device includes a device body disposed on the shield cover side and a key disposed on the door side, and when the door is closed, the key is inserted into the device body, and a switching mechanism built in the device body detects the door-closed state. Once the door is closed, a locking mechanism urged in the lock direction is activated and automatically locks the door. In order to allow the door to open, power is fed to an electromagnetic solenoid to release the locking mechanism.

CITATION LIST

Patent Literature

{PTL 1}
Japanese Unexamined Patent Application, Publication No. 2004-79204

SUMMARY OF INVENTION

According to an aspect of the present disclosure, there is provided a machine tool including: a door that opens and closes an opening in a shield cover surrounding a machining chamber; an electromagnetic lock device that includes dual-system switches that detect an open/close state of the door, and that can lock the door in a closed state; a door position detection unit that detects a position of the door; and a report unit that monitors states of the dual-system switches of the electromagnetic lock device and suggests maintenance of the door when the states differ from each other for a predetermined period of time and when the door position detection unit detects that the door is not in a closed position.

DESCRIPTION OF EMBODIMENTS

A machine tool 1 according to one embodiment of the present disclosure will now be described with reference to the drawings.

Figure 1:
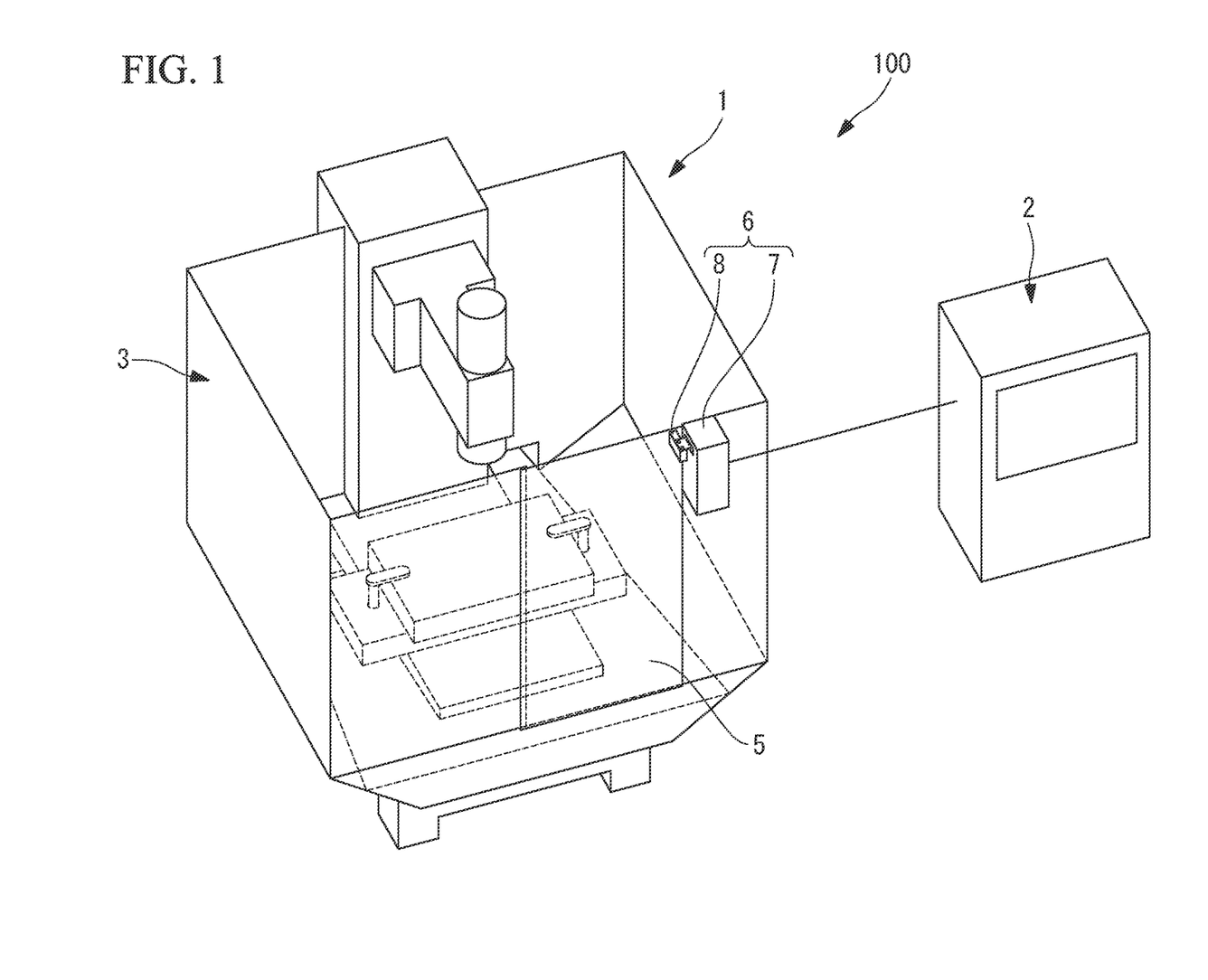
FIG. 1 is a perspective view of a machine tool according to one embodiment of the present disclosure with a door in an open state.

As illustrated in FIG. 1, the machine tool 1 of this embodiment includes a controller (door position detection unit and report unit) 2, a shield cover 3 that surrounds a machining chamber, a door 5 that opens and closes an opening 4 in the shield cover 3, and an electromagnetic lock device 6 that can lock the door 5 in a closed state.

Figure 2:
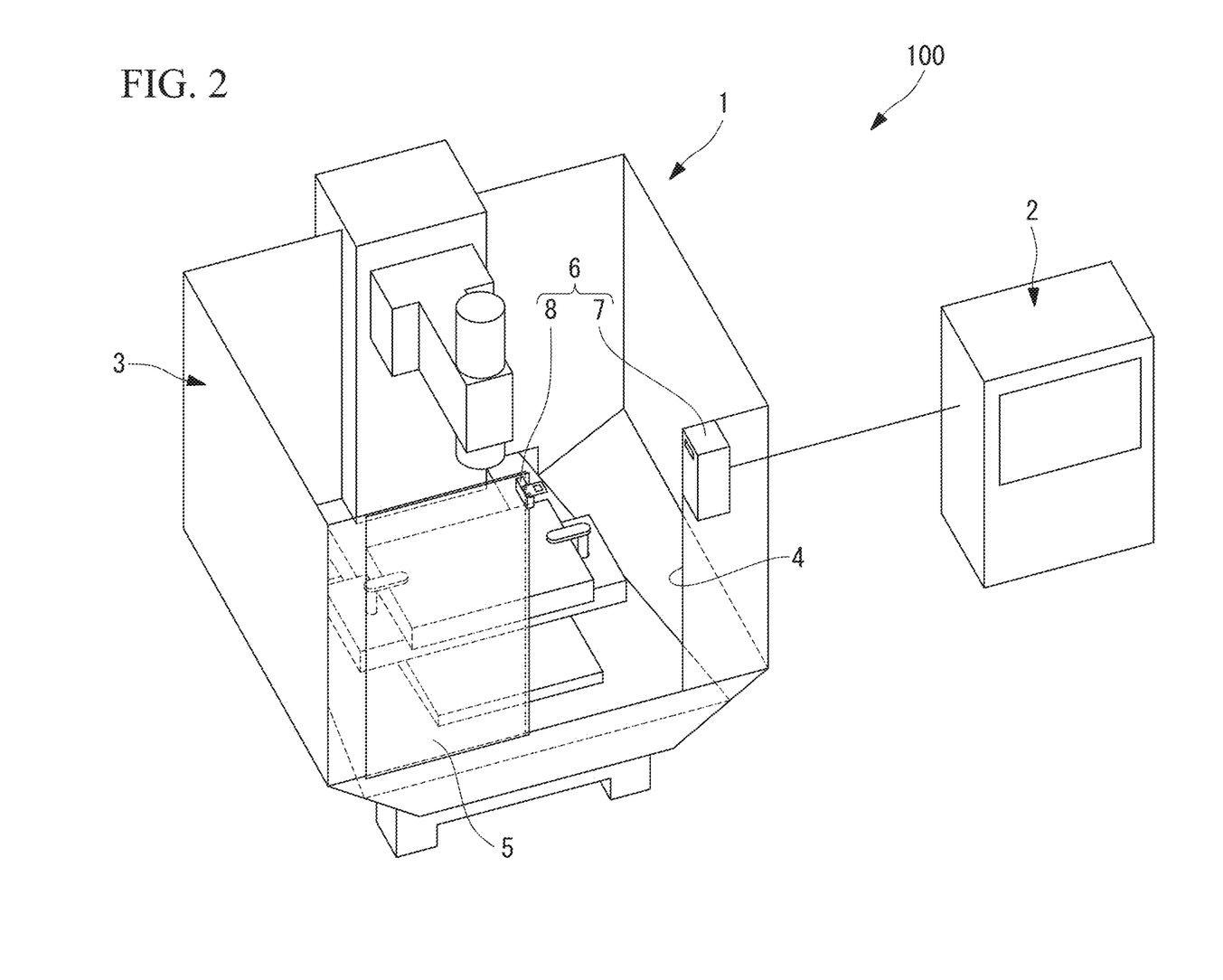
FIG. 2 is a perspective view of the machine tool illustrated in FIG. 1 with a door in a closed state.

The door 5 moves between a closed position at which the door 5 closes the opening 4 in the shield cover 3 as illustrated in FIG. 1, and an open position at which the door 5 opens the opening 4 as illustrated in FIG. 2.

The electromagnetic lock device 6 includes a device body 7 fixed in the vicinity of the opening 4 in the shield cover 3, and a key 8 fixed to the door 5.

According to this electromagnetic lock device 6, once the door 5 is closed, the key 8 is inserted into the device body 7, and the closed state of the door 5 is detected with the switching mechanism 9 built in the device body 7. Furthermore, once the door 5 is closed, a locking mechanism not illustrated in the drawing urged in the lock direction is activated to automatically lock the door 5. The electromagnetic lock device 6 outputs a lock signal while in the locked state. In order to allow the door 5 to open, power is fed to an electromagnetic solenoid (not illustrated in the drawing) to release the locking mechanism.

Figure 3:
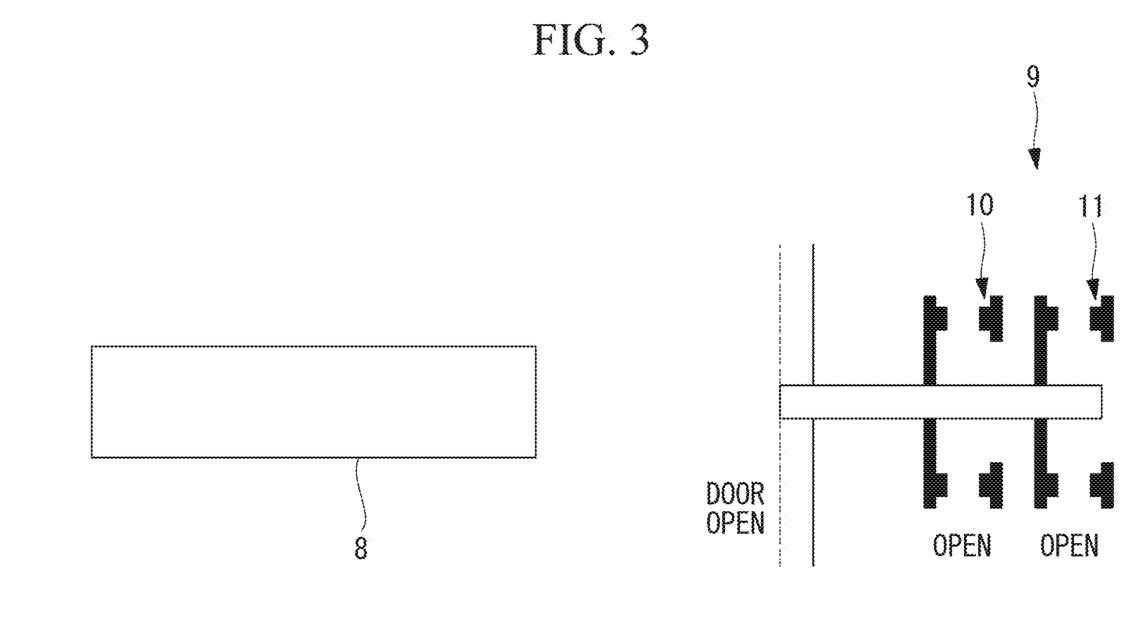
FIG. 3 is a schematic diagram illustrating states of two switches of a switching mechanism of an electromagnetic lock device when the door of the machine tool illustrated in FIG. 1 is in an open state.
Figure 4:
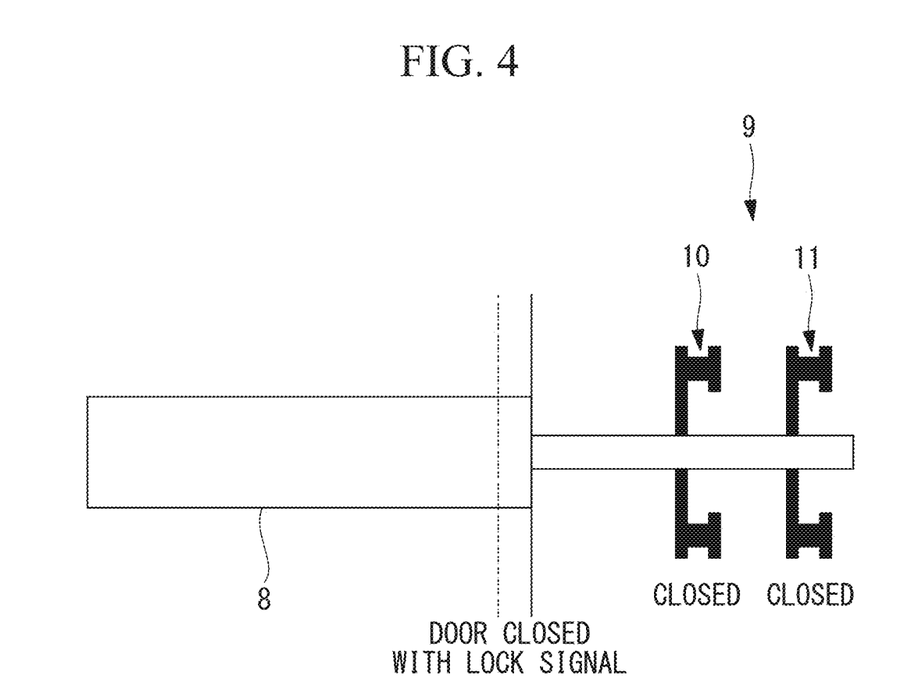
FIG. 4 is a schematic diagram illustrating states of two switches of the switching mechanism of the electromagnetic lock device when the door of the machine tool illustrated in FIG. 1 is in a completely closed state.

The switching mechanism 9 includes dual-system switches 10 and 11. As illustrated in FIGS. 3 and 4, these switches 10 and 11 assume ON-states when the door 5 is disposed in the close position, and assume OFF-states when the door 5 moves away from the close position. These switches 10 and 11 are designed so that switching between the ON-state and the OFF-state occurs simultaneously; however, in a strict sense, there is a time lag in switching between ON and OFF. Thus, a state illustrated in FIG. 5 occurs between the state illustrated in FIG. 3 and the state illustrated in FIG. 4.

Figure 6:
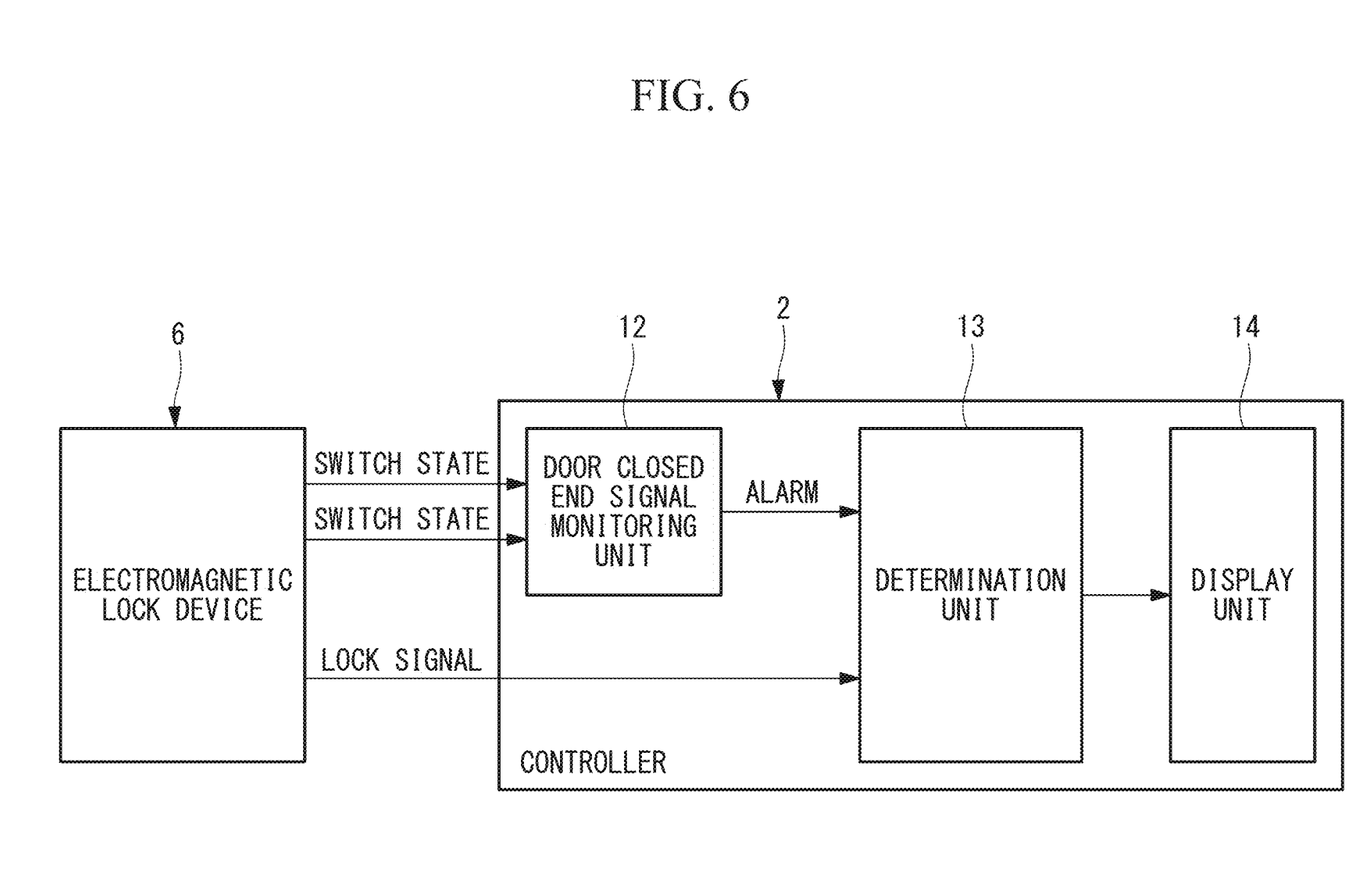
FIG. 6 is a block diagram illustrating the electromagnetic lock device and a controller of the machine tool illustrated in FIG. 1.

As illustrated in FIG. 6, the controller 2 includes a door closed end signal monitoring unit 12 connected to the switching mechanism 9 of the electromagnetic lock device 6. The door closed end signal monitoring unit 12 includes a timer (not illustrated) and two CPUs (not illustrated) that separately monitor the states of the dual-system switches 10 and 11 of the switching mechanism 9, and an alarm is output when the states of the dual-system switches 10 and 11 differ from each other for a predetermined period of time.

The controller 2 also includes a determination unit (door position detection unit) 13 that confirms whether there is a lock signal output from the electromagnetic lock device 6 when the alarm is output. If the lock signal is output, the door 5 is in a normal closed position, and thus the determination unit 13 determines that the cause of the alarm is the electromagnetic lock device 6.

The controller 2 includes a display unit (report unit) 14 that displays a first message suggesting maintenance of the electromagnetic lock device 6, such as "Replace the electromagnetic lock device", when the determination unit 13 determines that the cause of the alarm is the electromagnetic lock device 6.

Meanwhile, if the lock signal is not output, there is a high possibility that the door 5 is not in the normal closed position.

In this case, the determination unit 13 displays, on the display unit 14, a second message such as "If the door 5 is closed, check the vicinity of the door 5 and remove machining chips. If the door 5 is open, replace the electromagnetic lock device 6 or carry out maintenance of the electromagnetic lock device 6".

The operation of the machine tool 1 of this embodiment thus configured will now be described.

Figure 7:
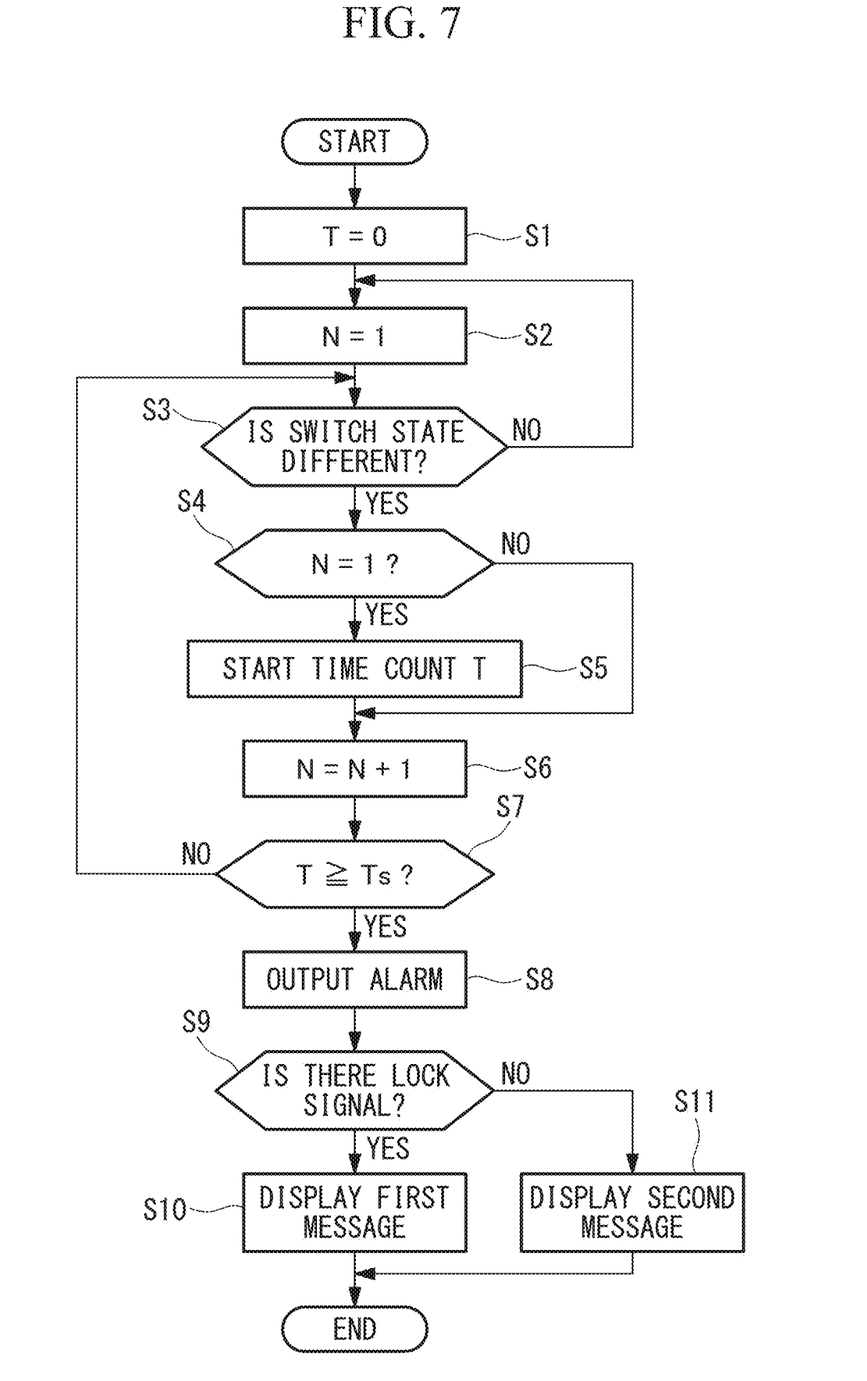
FIG. 7 is a flowchart illustrating operation of the machine tool illustrated in FIG. 1.

According to the machine tool 1 of this embodiment, as illustrated in FIG. 7, first, a timer T of the door closed end signal monitoring unit 12 is reset (step S1), and a counter N is reset to N=1 (step S2).

Next, whether the states of the dual-system switches 10 and 11 of the switching mechanism 9 in the electromagnetic lock device 6 differ from each other are monitored full-time (step S3).

In this case, the controller 2 monitors the dual-system switches 10 and 11 not only while the door 5 is closed manually or by a command from the controller 2 but also while the door 5 is open.

When the door 5 is completely closed, as illustrated in FIG. 4, the dual-system switches 10 and 11 both assume the ON-state, and when the door 5 is open, as illustrated in FIG. 3, the dual-system switches 10 and 11 both assume the OFF-state.

Figure 5:
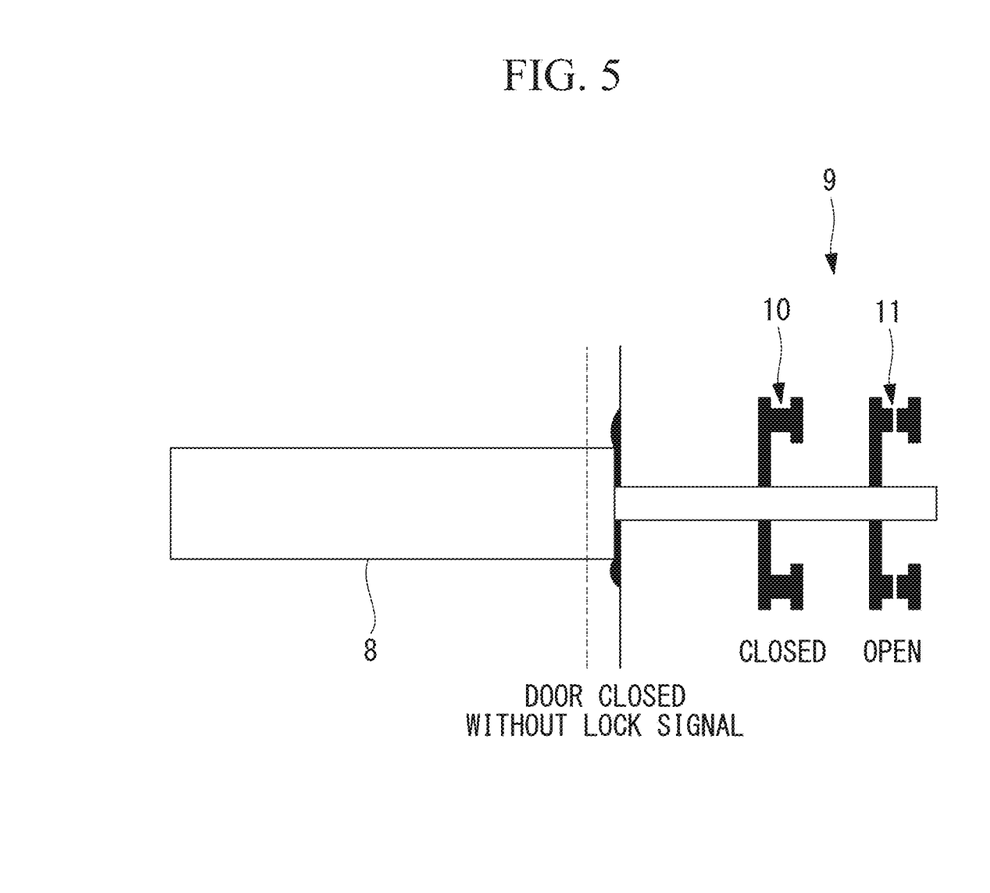
FIG. 5 is a schematic diagram illustrating states of two switches of the switching mechanism of the electromagnetic lock device when the door of the machine tool illustrated in FIG. 1 is in a transition state.

Meanwhile, in a transition state that occurs until the door 5 is completely closed, the time lag between opening and closing of the dual-system switches 10 and 11 causes the switch 10 to be in the ON-state while the switch 11 is in the OFF-state, as illustrated in FIG. 5.

If the switches 10 and 11 are in the same state, the process moves to the step S2. When the states of the switches 10 and 11 differ from each other, the timer T starts counting (step S5) only when counter N=1 (step S4), and the counter N is incremented (step S6). In the step S4, when the states of the switches 10 and 11 do not differ from each other, the process moves to the step S6.

Then whether the timer T is at a predetermined threshold Ts or more is determined (step S7). When the timer T is at a value less than the threshold Ts, the process from the step S3 is repeated, and when the timer T is at a value equal to or more than the threshold Ts, an alarm is output (step S8).

When the alarm is input, the determination unit 13 determines whether a lock signal is output from the electromagnetic lock device 6 (step S9).

When the door 5 is in the transition state, the electromagnetic lock device 6 cannot lock the key 8, and does not output a lock signal.

When a lock signal is output, the determination unit 13 displays the first message on the display unit 14 (step S10). When a lock signal is not output in the step S9, the determination unit 13 displays the second message on the display unit 14 (step S11).

As described above, according to the machine tool 1 of this embodiment, the states of the dual-system switches 10 and 11 in the electromagnetic lock device 6 are monitored full-time, and thus the dual check safety is functioning. In this manner, even when an abnormality occurs in the electromagnetic lock device 6, a problem such as unlocking of the door 5 during operation of the machine tool 1 can be avoided.

When the states of the dual-system switches 10 and 11 differ from each other for a predetermined period of time, an alarm is output. According to the machine tool 1 of this embodiment, when an alarm is output, whether there is a lock signal from the electromagnetic lock device 6 is determined, and different messages are displayed depending on the presence and absence of the lock signal.

In other words, when a lock signal is output from the electromagnetic lock device 6, it can be determined that the electromagnetic lock device 6 is in a correct lock state and the door 5 is completely in a closed position. Since an alarm is output despite this, it can be determined that there is an abnormality in the electromagnetic lock device 6 itself, such as disconnection and contact point failure in the switches 10 and 11.

Thus, in such a case, a message suggesting maintenance of the electromagnetic lock device 6 is displayed, the user can carry out maintenance or replacement of the electromagnetic lock device 6 promptly, and thus the time required for recovery can be shortened.

Meanwhile, when a lock signal is not output from the electromagnetic lock device 6, it can be determined that the electromagnetic lock device 6 is not in a correct lock state and the door 5 is either open or incompletely in a closed position (transition state). When the door 5 is open, the dual-system switches 10 and 11 are normally both in the OFF-state, and if an alarm is output, it can be determined that an abnormality has occurred in the electromagnetic lock device 6 itself. When the door 5 is closed, it is highly possible that the door 5 is incompletely in a closed position due to accumulation of machining chips or the like.

Thus, since the controller 2 displays both messages, the user can visually check the state of the door 5, and can perform measures appropriate for the case where the door 5 is clearly open or the case where the door 5 is incompletely closed.

Accordingly, there is an advantage that it is possible to prevent the problem of always performing measures, such as replacing the electromagnetic lock device 6, even when the door 5 is incompletely in a closed position due to accumulation of machining chips.

Note that, in this embodiment, whether the door 5 is positioned in a correct closed position is determined by the presence/absence of the lock signal from the electromagnetic lock device 6; however, this is not limiting, and determination may be made through different signals. For example, when the door 5 is operated by an actuator such as an air cylinder or a servomotor, whether the door 5 is in a correct closed position may be determined by the output from a position sensor that detects the operation position of the actuator.

When the actuator is an air cylinder, the position of the door 5 may be detected with a position sensor, such as a Hall sensor, that detects the position of the rod. When the actuator is a servomotor, an encoder may be used to detect the position of the door 5.

Alternatively, the machine tool 1 may include an imaging device that images the position of an end portion of the door 5, a handle fixed to the door 5, or the like, and the controller 2 may include an image processing device that processes the image acquired by the imaging device so as to detect the position of the door 5. The imaging device may be fixed relative to the machine tool 1, or may be attached to a robot that handles a workpiece to be loaded into and unloaded from the machine tool 1.

In addition, in this embodiment, the controller 2 in the machine tool 1 determines the presence of the abnormality in the electromagnetic lock device 6 or the abnormality of the position of the door 5, and displays a message. Alternatively, a machine tool system including multiple machine tools 1 and an upper-level controller 2 connected to the multiple machine tools 1 may determine the presence of the abnormality and display the message.

Furthermore, although an example of suggesting maintenance of the door 5 or the like through the display of the message to the operator has been described, alternatively, the operator may be notified through other means, such as sound.

REFERENCE SIGNS LIST 1 machine tool
2 controller
3 shield cover
4 opening
5 door
6 electromagnetic lock device
10, 11 switch
13 determination unit (door position detection unit)
14 display unit (report unit)

The invention claimed is:

1. A machine tool comprising:
a door that opens and closes an opening in a shield cover surrounding a machining chamber;
an electromagnetic lock device that includes dual-system switches that detect an open/closed state of the door, and that can lock the door in a closed state;
a controller,
wherein the controller is configured to:
monitor states of the dual-system switches of the electromagnetic lock device and output an alarm when the states differ from each other for a predetermined period of time;
determine, when the alarm is output, whether the door is in an open position or a closed position;
in response to determining that the door is in the open position, output a message suggesting maintenance of the door; and
in response to determining that the door is in the closed position, output a message different from the message suggesting maintenance of the door.

2. The machine tool according to claim 1, wherein the controller is configured to determine whether the door is in the open position or the closed position on the basis of a lock signal generated from the electromagnetic lock device when the door is locked by the electromagnetic lock device.

3. The machine tool according to claim 1, further comprising:
an actuator that operates the door and a position sensor that detects an operation position of the actuator,
wherein the controller is configured to determine whether the door is in the open position or the closed position on the basis of the operation position of the actuator detected with the position sensor.

4. The machine tool according to claim 3, wherein the actuator is an air cylinder.

5. The machine tool according to claim 3, wherein the actuator is a servomotor.

6. The machine tool according to claim 1, further comprising:
an imaging device that images the door,
wherein the controller is configured to:
process an image acquired by the imaging device; and
determined whether the door is in the open position or the closed position on the basis of the processed image.

7. A machine tool system comprising:
a machine tool and a controller,
wherein the machine tool includes a door that opens and closes an opening in a shield cover surrounding a machining chamber, and an electromagnetic lock device that includes dual-system switches that detect an open/closed state of the door and that can lock the door in a closed state, and
the controller is configured to:
monitor states of the dual-system switches of the electromagnetic lock device and output an alarm when the states differ from each other for a predetermined period of time;
determine, when the alarm is output, whether the door is in an open position or a closed position;
in response to determining that the door is in the open position, output a message suggesting maintenance of the door; and
in response to determining that the door is in the closed position, output a message different from the message suggesting maintenance of the door.

* * * * *